(12) United States Patent
Guard et al.

(10) Patent No.: US 7,413,327 B2
(45) Date of Patent: Aug. 19, 2008

(54) VEHICLE LIGHTING FIXTURE

(75) Inventors: Peter S. Guard, Sammamish, WA (US); Erik I. Wiman, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 11/401,683

(22) Filed: Apr. 10, 2006

(65) Prior Publication Data

US 2007/0236926 A1    Oct. 11, 2007

(51) Int. Cl.
*B64D 47/02* (2006.01)
*F21V 1/00* (2006.01)
*F21V 1/20* (2006.01)
*B64F 1/20* (2006.01)

(52) U.S. Cl. .................. 362/470; 362/479; 362/236; 362/237; 362/240; 362/244; 340/815.45

(58) Field of Classification Search ................. 362/470, 362/471, 251, 236, 237, 240, 244, 246, 248, 362/249; 340/815.45
See application file for complete search history.

(56) References Cited

U.S. PATENT DOCUMENTS

| | | | |
|---|---|---|---|
| 2,302,092 A | 11/1942 | Arenberg | |
| 2,582,738 A | 1/1952 | Arenberg | |
| 6,283,621 B1 * | 9/2001 | Macri | 362/488 |
| 6,523,976 B1 | 2/2003 | Turnbull et al. | |
| 6,578,994 B1 | 6/2003 | Beyerlein | 362/490 |
| 6,796,690 B2 * | 9/2004 | Bohlander | 362/471 |
| 2005/0140270 A1 | 6/2005 | Henson et al. | |

* cited by examiner

*Primary Examiner*—Sean P Gramling
(74) *Attorney, Agent, or Firm*—Wildman, Harrold, Allen & Dixon, LLP

(57) ABSTRACT

A programmable and alternately configurable lighting fixture including a light emitting diode array adapted to affixed within a fixture housing. The lighting fixture includes a controller that is adapted to selectively power the plurality of light emitting diodes to provide two or more light beam patterns, each of the two or more light beam patterns selectively directable to two or more distinct lighting areas. The controller and the plurality of light emitting diodes are conductively connected to a power supply. The controller is programmable such that the lighting fixture is adaptable to various seating and lighting configurations, for instance a two seat/two beam configuration, a three seat/three beam configuration or a four seat/four beam configuration. Interchangeable lens assemblies are configured to appropriately direct and focus the selected number of lighting beams to the selected and distinct lighting areas.

25 Claims, 4 Drawing Sheets

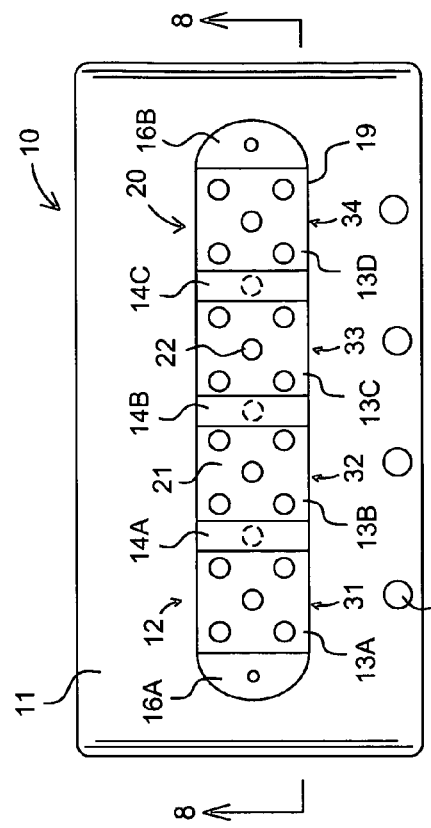
FIG. 6
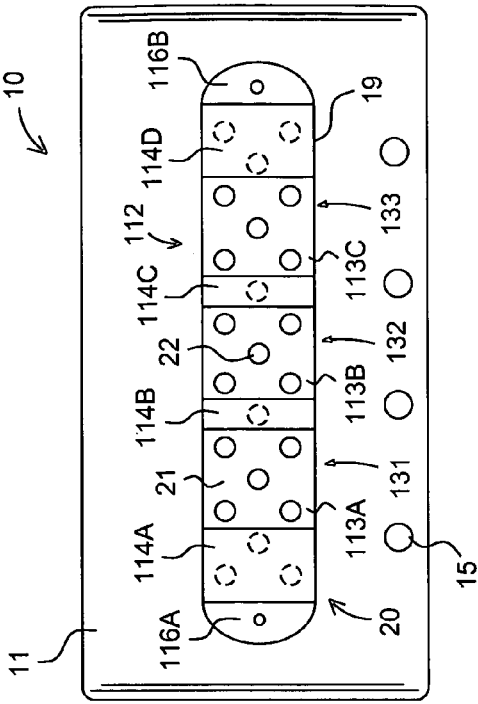
FIG. 7
FIG. 4
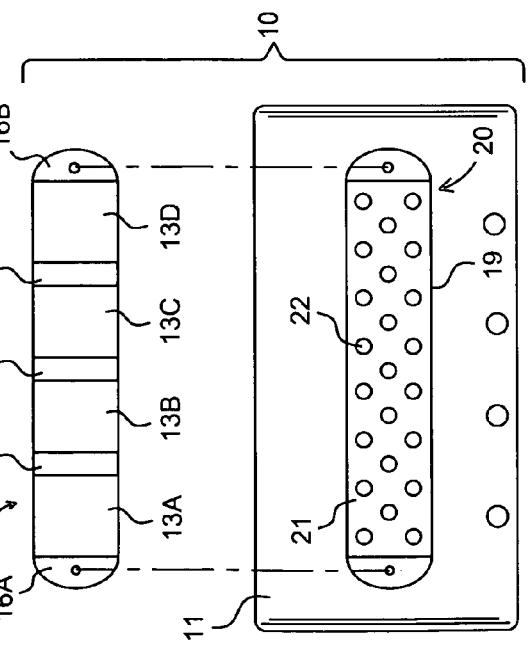
FIG. 5

VEHICLE LIGHTING FIXTURE

BACKGROUND

The present application relates generally to lighting fixtures and, more particularly, to lighting fixtures utilized in passenger vehicles, such as aircraft, trains, buses, ships, etc.

A variety of lighting fixtures or elements, including fixtures comprising one or more light emitting diodes (LEDs), are disclosed in the prior art. In some cases, these lighting elements include one or more LEDs enclosed in a housing having an optically neutral lens. In other cases, lighting elements may include focusing or coloring optics adapted to a particular purpose. For example, LEDs may be selectively powered to control a light beam pattern, including, the shape, size, intensity and direction of the light beam pattern. A controller can provide manual or automatic control of the light beam pattern to adjust an illumination area.

To the extent that conventional lighting fixtures have the capability to aim or direct a beam, this capability is typically limited to expanding or limiting a beam so as to direct a beam at a particular sub-region within a larger lighting region, e.g., the area defined by an area of a seat positioned below the fixture. As a result, one such fixture is often required for each user. For instance in an aircraft, one such fixture would be installed for each seat. To the extent that conventional lighting fixtures permit variation in directing the beam of light, the variation is typically limited to directing a beam to particular sub-region of a larger region, e.g., the area defined by the area of a seat positioned below the fixture. Again, one such fixture is often required for each user, resulting in the need for the installation of one such fixture for each seat.

SUMMARY

The above-mentioned drawbacks associated with existing lighting fixtures are addressed by embodiments of the present application, which will be understood by reading and studying the following specification.

In one embodiment, a lighting fixture comprises a housing, a substrate positioned within the housing, and an illumination array affixed to the substrate, the illumination array including a plurality of illumination elements adapted to emit light. The lighting fixture further comprises a controller conductively connected to the illumination array, the controller adapted to selectively power the plurality of illumination elements to provide two or more light beam patterns. Each of the two or more light beam patterns are directed to one of the two or more distinct non-contiguous lighting areas.

In another embodiment, a programmable and alternately configurable lighting fixture comprises a housing including an aperture formed within the housing and a substrate positioned within the housing. The lighting fixture further comprises an illumination array affixed to the substrate, the illumination array including a plurality of illumination elements adapted to emit two or more light beam patterns through the aperture formed within the housing, and an interchangeable lens assembly adapted to direct each of the two or more light beam patterns to one of the two or more distinct lighting areas. The lighting fixture further comprises a controller conductively connected to the illumination array, the controller adapted to selectively power the plurality of illumination elements to provide the two or more light beam patterns.

In another embodiment, a vehicle comprises a seating configuration including at least two seats and a programmable and alternately configurable lighting fixture positioned above the at least two seats. The lighting fixture includes a housing including an aperture formed within the housing, a substrate positioned within the housing, and an illumination array affixed to the substrate, the illumination array including a plurality of illumination elements adapted to emit two or more light beam patterns through the aperture formed within the housing. The lighting fixture further comprises an interchangeable lens assembly adapted to direct each of the two or more light beam patterns to one of the two or more distinct lighting areas, each of the two or more distinct lighting areas associated with one of the at least two seats of the seating configuration, and a controller conductively connected to the illumination array, the controller adapted to selectively power the plurality of illumination elements to provide the two or more distinct non-contiguous light beam patterns.

These and other embodiments of the present application will be discussed more fully in the detailed description. The features, functions, and advantages can be achieved independently in various embodiments of the present application, or may be combined in yet other embodiments.

BRIEF DESCRIPTION OF DRAWINGS

FIG. 4 is a representative front view of a lighting fixture according to the one embodiment of the present application.

FIG. 5 is a representative bottom exploded view of a lighting fixture according to the one embodiment of the present application.

FIG. 6 is a representative bottom exploded view of a lighting fixture adapted to provide four lighting beams.

FIG. 7 is a representative bottom exploded view of a lighting fixture adapted to provide three lighting beams.

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
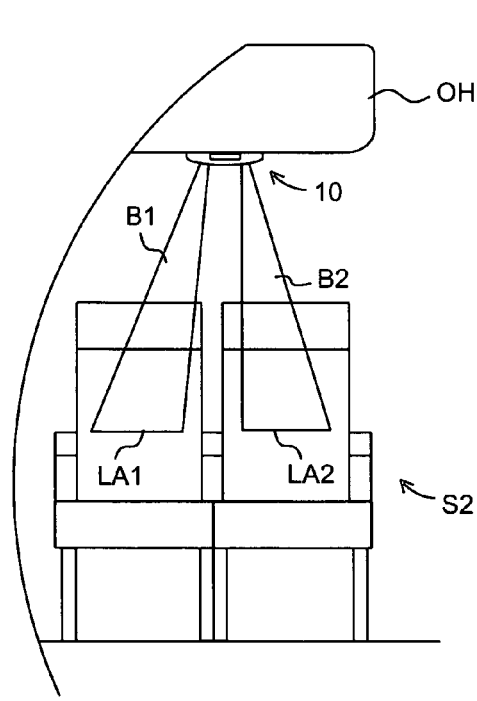
FIG. 1 is a representative front view of a two-seat seating configuration including a lighting fixture, programmed to produce two lighting beams.
Figure 2:
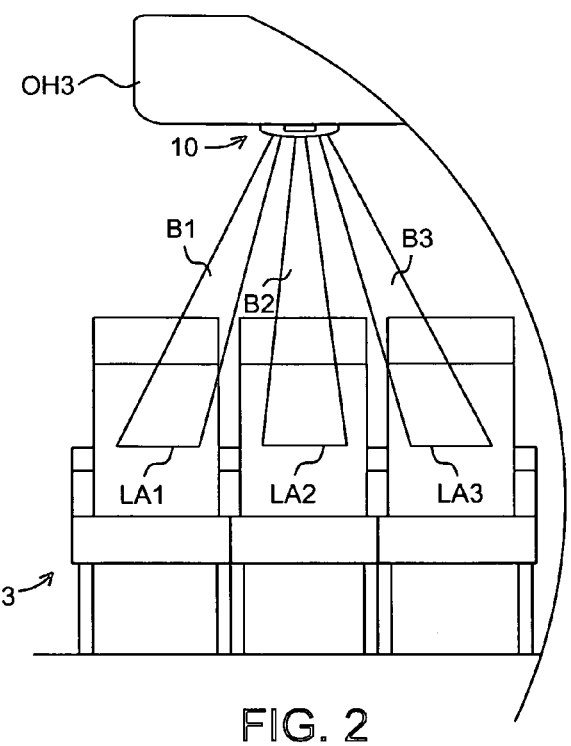
FIG. 2 is a representative front view of a three-seat seating configuration including a lighting fixture, programmed to produce three lighting beams.
Figure 3:
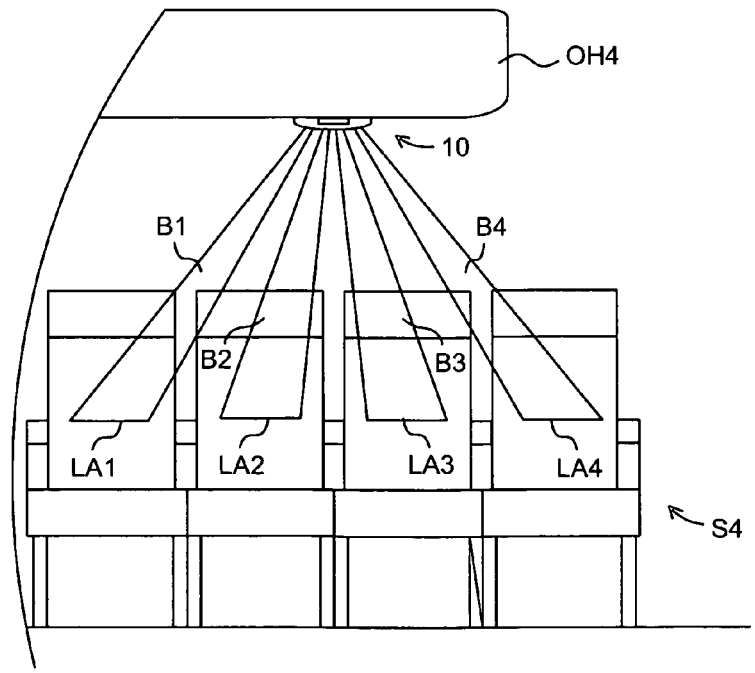
FIG. 3 is a representative front view of a four-seat seating configuration including a lighting fixture, programmed to produce four lighting beams.
Figure 10:
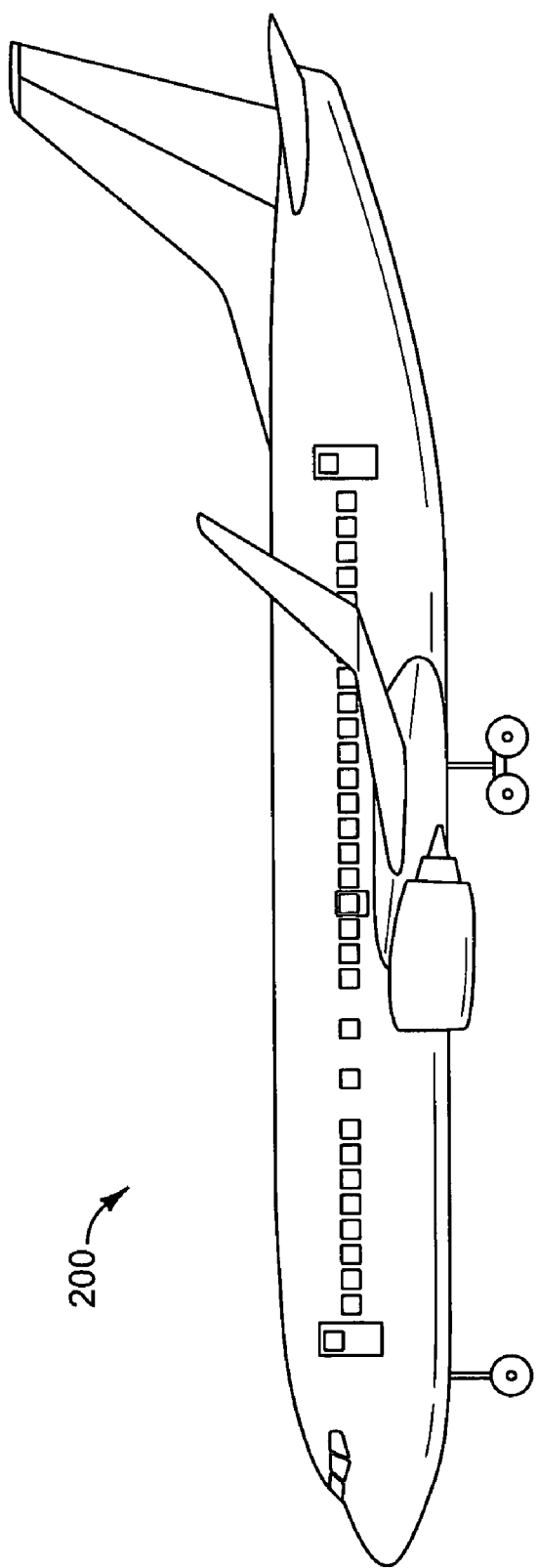
FIG. 10 is a schematic of an aircraft including overhead lighting fixtures according to one embodiment of the present application.

FIGS. 1 through 3 are representative views of various seating installations in passenger vehicles, which include overhead lighting fixtures 10. For purposes of illustration in this disclosure, the lighting fixtures 10 are described primarily with reference to an aircraft, such as, for example, the aircraft 200 illustrated in FIG. 10. The lighting fixtures 10 can also be used, however, in other passenger vehicles, such as buses, trains, ships, etc.

FIG. 1 shows a front view of a two-seat configuration S2, including lighting fixture 10 attached to an underside of overhead unit OH2. In FIG. 1, lighting fixture 10 is shown adapted and programmed to produce two distinct non-contiguous light beams B1 and B2 that illuminate separate and distinct lighting areas LA1 and LA2. FIG. 2 shows a front view of a three-seat configuration S3, including lighting fixture 10 attached to an underside of overhead unit OH3. As shown in FIG. 2, lighting fixture 10 is adapted and programmed to produce three distinct non-contiguous light beams B1, B2 and B3 that illuminate separate and distinct lighting areas LA1, LA2 and LA3. FIG. 3 shows a front view of a four-seat configuration S4, including lighting fixture 10 attached to an underside of overhead unit OH4. In FIG. 3, lighting fixture 10 is shown adapted and programmed to produce four distinct non-contiguous light beams B1 through B4 that illuminate separate and distinct lighting areas LA1 through LA4.

FIG. 4 is a front view of one embodiment of lighting fixture 10. In the illustrated embodiment, lighting fixture 10 comprises a housing 11 and a service signal light 18. Housing 11 forms a part of an overhead passenger service unit (PSU), which typically comprises injection-molded plastic. Lighting fixture 10 is preferably configured to provide a variety of forward and rearward facing illuminated service and warning indicators or messages.

Referring to FIGS. 5 through 7, lighting fixture 10 is shown including housing 11 having aperture 19. Illumination array 20 includes a plurality of illumination elements 22 affixed to substrate 21. In the illustrated embodiments, the illumination elements 22 comprise light emitting diodes (LEDs), each having an output power of about 1 watt and arranged at a pitch of about 1 inch. As used herein, the term "pitch" denotes the center-to-center distance between adjacent illumination elements 22 in the array 20. In other embodiments, the illumination elements 22 may comprise a different number of LEDs, LEDs having a different output power (e.g., 3 watts, 5 watts, etc.), and/or LEDs arranged at a different pitch. In still other embodiments, the illumination array 20 may comprise a wide variety of other suitable illumination elements 22, such as, for example, organic LEDs (OLEDs), bi-state LEDs, tri-state LEDs, digital light processing (DLP) lamps, liquid crystal displays (LCDs), film membranes, halogen lamps, phosphor coatings activated by remote sources, etc.

Referring to FIGS. 5 and 6, lens assembly 12 is removably attachable within aperture 19 and is configured to emit four distinct non-contiguous light beams. More particularly, lens assembly 12 is divided into four distinct lens sections 13A through 13D by opaque lens partitions 14A through 14C. Lens sections 13A through 13D may comprise a variety of suitable materials that are substantially transparent, such as, for example, transparent polycarbonate or acrylic. In addition, lens partitions 14A through 14C may comprise a variety of suitable materials that are substantially opaque, such as, for example, polycarbonate or another high-performance plastic.

Lens assembly 12 also includes lands 16A and 16B which provide attachment points at either end of lens assembly 12 for connection within aperture 19. As shown in FIG. 6, opaque lens partitions 14A through 14C divide illumination array 20 into four illumination sub-arrays 31 through 34. In the illustrated embodiment, each of the four illumination sub-arrays 31 through 34 comprises five 1-watt LEDs, and each illumination sub-array 31 through 34 is separately switchable by operation of an assigned and corresponding switch 15. In other embodiments, the illumination sub-arrays 31 through 34 may comprise a different number of LEDs, LEDs having a different output power, and/or different illumination elements.

Referring to FIG. 7, lens assembly 112 is removably attachable within aperture 19 and is configured to emit three distinct light beams. More particularly, lens assembly 112 is divided into three distinct lens sections 113A through 113C by opaque lens partitions 114A through 114D. Again, lens assembly 112 includes lands 116A and 116B which provide attachment points at either end of lens assembly 112 for connection within aperture 19. As shown in FIG. 7, opaque lens partitions 114A through 114D divide illumination array 20 into three illumination sub-arrays 131 through 133. In the illustrated embodiment, each of the three illumination sub-arrays 131 through 133 comprises five 1-watt LEDs, and each illumination sub-array 131 through 133 is separately switchable by operation of an assigned and corresponding switch 15. In other embodiments, the illumination sub-arrays 131 through 133 may comprise a different number of LEDs, LEDs having a different output power, and/or different illumination elements.

Figure 8:
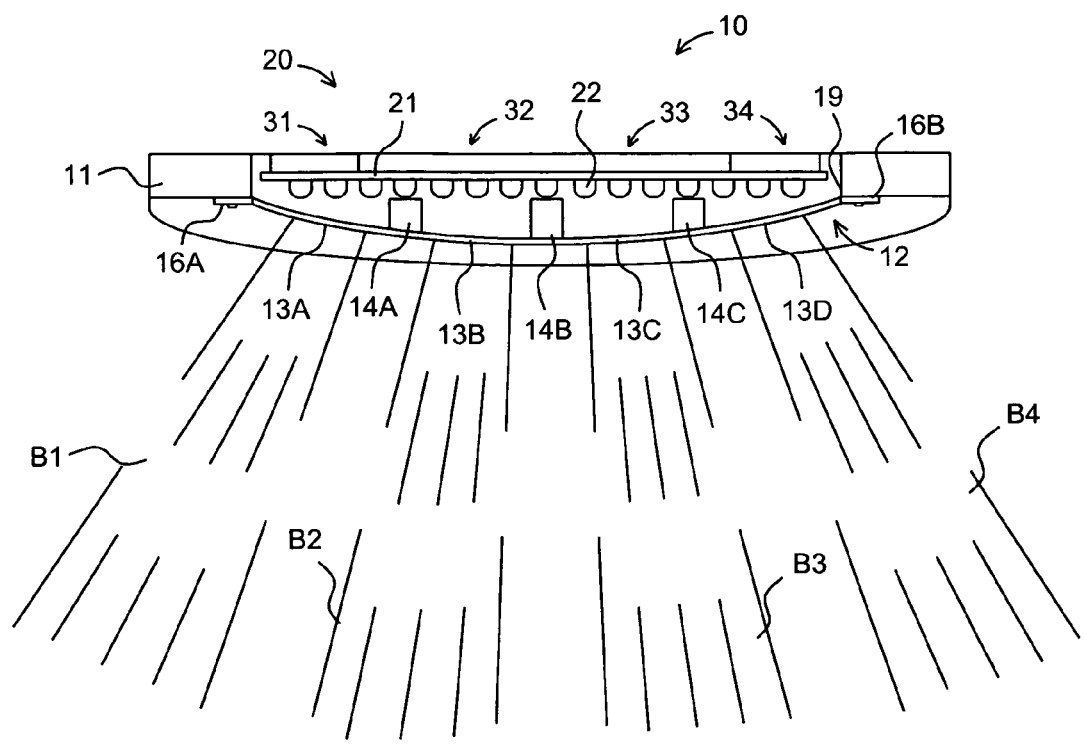
FIG. 8 is a representative side sectional view of a lighting fixture adapted to provide four lighting beams.

FIG. 8 is a representative side sectional view of lighting fixture 10, as shown in FIG. 6, adapted to provide four lighting beams B1 through B4. As shown, lighting fixture 10 includes a housing 11 and a lens assembly 12. Lens assembly 12 includes lands 16A and 16B which provide attachment points at either end of lens assembly 12 for connection within aperture 19. Illumination array 20 includes a plurality of illumination elements 22 affixed to substrate 21. Lens assembly 12 is divided into four distinct lens sections 13A through 13D by opaque lens partitions 14A through 14C. Opaque lens partitions 14A through 14C divide illumination array 20 into four illumination sub-arrays 31 through 34. Each of the four distinct lens sections 13A through 13D of lens assembly 12 can be configured in a manner known by those skilled in the art of lens design and manufacture, to direct and focus the associated lighting beam B1 through B4, to a selected and distinct lighting area, as seen in FIG. 3.

Figure 9:
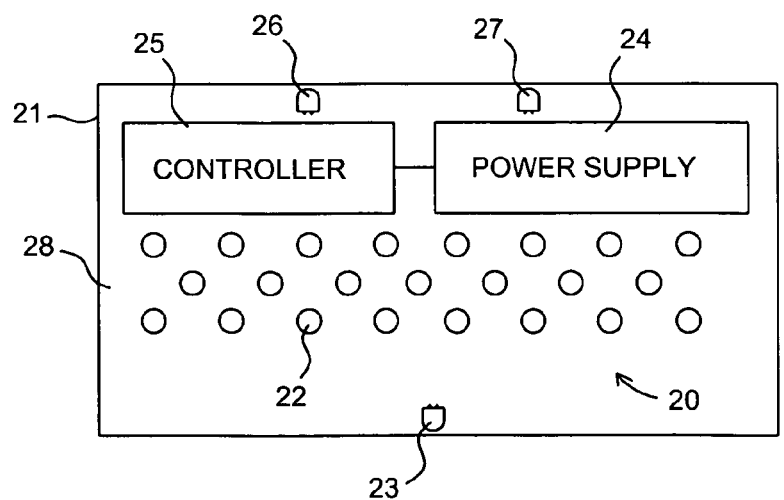
FIG. 9 is a representative bottom view of a printed circuit board including an array light emitting diodes, power supply and controller circuitry.

FIG. 9 illustrates a bottom view of substrate 21 including illumination array 20 affixed thereto. In the illustrated embodiment, substrate 21 comprises a printed circuit board 28. Illumination array 20 includes a plurality of illumination elements 22. In addition, in the embodiment shown in FIG. 9, forward facing illumination element 23 is provided for illumination of a service signal light 18, as seen in FIG. 4. Additionally, illumination elements 26 and 27 may provide illumination for rearward facing warning indicators or messages. As shown in FIG. 9, power supply 24 and controller 25 are also shown affixed to substrate 21 and conductively connected to each other as well as to illumination array 20.

Controller 25 is preferably configured to permit lighting fixture 10 to be programmed for use in any of a number of possible seating configurations, for example as shown in FIGS. 1 through 3 as discussed above. For example, in some embodiments, controller 25 comprises a stamp processor including three native programs corresponding to the three seating configurations illustrated in FIGS. 1 through 3. The appropriate native program to control the operation of the illumination array 20 can be selected based on the lens assembly 12 inserted into aperture 19.

For example, when the lens assembly 12 illustrated in FIGS. 5, 6 and 8 is inserted into aperture 19, the lens partitions 14A through 14C may contact one or more pressure switches (not shown) on substrate 21, thereby communicating to controller 25 that lighting fixture 10 is being used to illuminate a four-seat configuration S4, shown in FIG. 3. As a result, controller 25 will select the native program corresponding to this seating configuration to control the operation of the illumination array 20. In this example, the selected native program will control the operation of the illumination array 20 such that it is subdivided into four illumination sub-arrays 31 through 34, each of which is separately switchable by operation of an assigned and corresponding switch 15. When a switch 15 corresponding to a particular illumination sub-array 31 through 34 is activated, the associated illumination sub-array 31 through 34 is energized, while the illumination elements 22 located beneath opaque lens partitions 14A through 14C are programmed not to illuminate.

To provide another example, when the lens assembly 12 illustrated in FIG. 7 is inserted into aperture 19, the lens partitions 114A through 114D may contact one or more pressure switches (not shown) on substrate 21, thereby communicating to controller 25 that lighting fixture 10 is being used to illuminate a three-seat configuration S3, shown in FIG. 2. As a result, controller 25 will select the native program corresponding to this seating configuration to control the operation of the illumination array 20. In this example, the selected native program will control the operation of the illumination array 20 such that it is subdivided into three illumination sub-arrays 131 through 133, each of which is separately switchable by operation of an assigned and corresponding switch 15. When a switch 15 corresponding to a particular illumination sub-array 131 through 133 is activated, the associated illumination sub-array 131 through 133 is energized, while the illumination elements 22 located beneath opaque lens partitions 114A through 114D are programmed not to illuminate.

In the examples described above, controller 25 selects the appropriate native program for a given seating configuration based on physical contacts made between the lens partitions 14A through 14C or 114A through 114D and one or more pressure switches located on substrate 21. Other embodiments may employ a wide variety of other suitable switching devices, such as, for example, magnetic switches, radio frequency (RF) controlled electronic switches, etc. In addition, controller 25 may select the appropriate native program based on physical contacts made in other locations (e.g., lands 16) or based on non-physical contacts, such as, for example, RF or infrared (IR) transmissions made to the controller 25 from the lens assembly 12 or from another suitable programming device.

The systems and methods described above present a number of distinct advantages over traditional passenger vehicle illumination systems. For example, conventional illumination systems typically require one overhead lighting fixture for each passenger seating area. As a result, these systems typically require a unique overhead PSU design for each unique seating configuration.

By contrast, using the systems and methods described above, a single illumination array 20 can be used to illuminate multiple passenger seating areas. Therefore, as described above, such an illumination array 20 can advantageously be adapted to illuminate different seating configurations by selecting different lens assemblies 12, for example. As a result, a uniform, modular design for an overhead PSU can be implemented throughout an entire passenger vehicle or fleet of vehicles, regardless of the different seating configurations implemented in the vehicles. Such a modular design can significantly reduce the cost and complexity associated with traditional passenger vehicle illumination systems.

Although this invention has been described in terms of certain preferred embodiments, other embodiments that are apparent to those of ordinary skill in the art, including embodiments that do not provide all of the features and advantages set forth herein, are also within the scope of this invention. For instance, while FIGS. 1 through 3 depict three possible seating and lighting configurations, the invention is in no sense limited to the depicted configurations. Rather, the scope of the present invention is defined only by reference to the appended claims and equivalents thereof.

What is claimed is:

1. A lighting fixture comprising: a housing; a substrate positioned within the housing; an illumination array affixed to the substrate, the illumination array including a plurality of illumination elements adapted to emit light; a controller conductively connected to the illumination array, the controller adapted to selectively power the plurality of illumination elements to provide two or more light beam patterns, each of the two or more light beam patterns directed to one of two or more distinct non-contiguous lighting areas, wherein the controller comprises a stamp processor including a plurality of native programs, wherein each native program corresponds to a distinct lighting area.

2. The lighting fixture of claim 1, further comprising a lens assembly including two or more lens sections and at least one lens partition, each of the two or more lens sections adapted to direct one of the two or more light beam patterns to one of the two or more distinct non-contiguous lighting areas.

3. The lighting fixture of claim 1, further comprising two or more switches, each of the two or more switches corresponding to one of the two or more light beam patterns for selectively switching one of the two or more light beam patterns between an on and an off position.

4. The lighting fixture of claim 1, wherein the housing further comprises an aperture formed within the housing and the plurality of illumination elements are adapted to emit two or more light beam patterns through the aperture.

5. The lighting fixture of claim 1, wherein the illumination elements comprise light emitting diodes.

6. The lighting fixture of claim 1, wherein the illumination elements comprise organic LEDs, bi-state LEDs, tri-state LEDs, digital light processing lamps, liquid crystal displays, film membranes, halogen lamps, or phosphor coatings.

7. The lighting fixture of claim 1, wherein the housing further comprises a service signal light or a warning signal light.

8. A programmable and alternately configurable lighting fixture comprising: a housing including an aperture formed within the housing; a substrate positioned within the housing; an illumination array affixed to the substrate, the illumination array including a plurality of illumination elements adapted to emit two or more light beam patterns through the aperture formed within the housing; an interchangeable lens assembly adapted to direct each of the two or more light beam patterns to a distinct lighting area; and a controller conductively connected to the illumination array, the controller adapted to selectively power the plurality of illumination elements to provide the two or more light beam patterns, wherein the controller comprises a stamp processor including a plurality of native programs, wherein each native program corresponds to a distinct lighting area.

9. The programmable and alternately configurable lighting fixture of claim 8, wherein the native program corresponding to a distinct lighting area is selected based on contacts made between the interchangeable lens assembly and one or more pressure switches, magnetic switches, or electronic switches.

10. The programmable and alternately configurable lighting fixture of claim 8, wherein the native program corresponding to a distinct lighting area is selected based on one or more radio frequency transmissions or infrared transmissions to the stamp processor.

11. The programmable and alternately configurable lighting fixture of claim 8, wherein the controller is adapted to configure the illumination array as two or more separate illumination sub-arrays.

12. The programmable and alternately configurable lighting fixture of claim 8, wherein the lens assembly comprises two or more lens sections comprising a substantially transparent material.

13. The programmable and alternately configurable lighting fixture of claim 8, wherein the lens assembly comprises at least one lens partition comprising a substantially opaque material.

14. The programmable and alternately configurable lighting fixture of claim 8, wherein the illumination elements comprise light emitting diodes.

15. The programmable and alternately configurable lighting fixture of claim 8, wherein the illumination elements comprise organic LEDs, bi-state LEDs, tri-state LEDs, digital light processing lamps, liquid crystal displays, film membranes, halogen lamps, or phosphor coatings.

16. The programmable and alternately configurable lighting fixture of claim 8, further comprising two or more switches, each of the two or more switches corresponding to one of the two or more light beam patterns for selectively switching one of the two or more light beam patterns between an on and an off position.

17. The programmable and alternately configurable lighting fixture of claim 8, wherein the housing further comprises a service signal light or a warning signal light.

18. A vehicle comprising: a seating configuration including at least two seats; a programmable and alternately configurable lighting fixture positioned above the at least two seats, the lighting fixture including; a housing including an aperture formed within the housing; a substrate positioned within the housing; an illumination array affixed to the substrate, the illumination array including a plurality of illumination elements adapted to emit two or more light beam patterns through the aperture formed within the housing; an interchangeable lens assembly adapted to direct each of the two or more light beam patterns to one of two or more distinct lighting areas, each of the two or more distinct lighting areas associated with one of the at least two seats of the seating configuration; and a controller conductively connected to the illumination array, the controller adapted to selectively power the plurality of illumination elements to provide two or more distinct non-contiguous light beam patterns, wherein the controller comprises a stamp processor including a plurality of native programs, wherein each native program corresponds to a distinct lighting area.

19. The vehicle of claim 18, wherein the controller is adapted to be programmed for use in a variety of seating and lighting configurations.

20. The vehicle of claim 18, wherein the interchangeable lens assembly comprises two or more lens sections and at least one lens partition, each of the two or more lens sections adapted to direct one of the two or more light beam patterns to one of the two or more distinct lighting areas.

21. The vehicle of claim 18, wherein the lighting fixture further comprises two or more switches, each of the two or more switches corresponding to one of the two or more light beam patterns for selectively switching one of the two or more light beam patterns between an on and an off position.

22. The vehicle of claim 18, wherein the illumination elements comprise light emitting diodes.

23. The vehicle of claim 18, wherein the illumination elements comprise organic LEDs, bi-state LEDs, tri-state LEDs, digital light processing lamps, liquid crystal displays, film membranes, halogen lamps, or phosphor coatings.

24. The vehicle of claim 18, wherein the vehicle comprises an aircraft.

25. The vehicle of claim 18, wherein the vehicle comprises a bus, train or ship.

\* \* \* \* \*